(12) United States Patent
Miller et al.

(10) Patent No.: US 7,000,131 B2
(45) Date of Patent: Feb. 14, 2006

(54) APPARATUS AND METHOD FOR ASSUMING MASTERSHIP OF A BUS

(75) Inventors: William V. Miller, Arlington, TX (US); Richard L. Duncan, Bedford, TX (US)

(73) Assignee: Via Technologies, Inc., Taipei (TW)

( * ) Notice: Subject to any disclaimer, the term of this patent is extended or adjusted under 35 U.S.C. 154(b) by 306 days.

(21) Appl. No.: 10/713,838

(22) Filed: Nov. 14, 2003

(65) Prior Publication Data
US 2005/0108455 A1 May 19, 2005

(51) Int. Cl.
*G06F 1/32* (2006.01)
*G06F 13/00* (2006.01)
(52) U.S. Cl. .................... 713/322; 713/323; 713/324; 713/601; 710/107; 710/113
(58) Field of Classification Search .................. None
See application file for complete search history.

(56) References Cited

U.S. PATENT DOCUMENTS

| 5,652,895 | A | * | 7/1997 | Poisner ................. 713/322 |
| 6,163,848 | A | * | 12/2000 | Gephardt et al. .......... 713/322 |
| 6,560,712 | B1 | | 5/2003 | Arends et al. ............ 713/320 |
| 2003/0172310 | A1 | * | 9/2003 | Moyer et al. ............. 713/300 |

* cited by examiner

*Primary Examiner*—Glenn A. Auve
(74) *Attorney, Agent, or Firm*—Thomas, Kayden, Horstemeyer & Risley (57) ABSTRACT

The present invention is generally directed to an apparatus and method for reducing excess power consumption of a bus master circuit component for use in a multi-bus master system. In one embodiment, the bus master is provided in the form of an integrated circuit comprising clock control logic that is configured to disable a clock signal that is otherwise delivered to functional circuitry contained within the integrated circuit during a period of time between the request for mastership of a bus and the grant of that request.

16 Claims, 6 Drawing Sheets

APPARATUS AND METHOD FOR ASSUMING MASTERSHIP OF A BUS

FIELD OF THE INVENTION

The present invention generally relates to bus arbitration in computing systems, and more specifically to an apparatus and method for assuming mastership of a bus.

BACKGROUND

Computing systems having multiple bus masters are well known. Indeed, microprocessor designs typically allow a bus to have multiple masters through a defined bus arbitration scheme. Typically, an external device requests "ownership" of a bus via a bus request signal. This signal is directed to an arbitration device that grants ownership of the bus through a bus grant signal. Typically, devices capable of operating as a master of a given bus have logic for generating a bus request signal, as well as logic for receiving a bus grant signal. In turn, the bus request signals are directed to arbitration logic, which arbitration logic also generates the bus grant signals that are delivered to the various bus masters. The bus arbitration logic coordinates and manages the bus mastership, assigning mastership to only one master at a time, in order to avoid bus contentions.

In most systems, a given bus master is unaware of the activities of other bus masters. In this regard, a given bus master may request mastership of a bus, but then await the grant of the bus mastership by the arbitration logic. Further, a given bus master typically has no antecedent knowledge as to how long it will wait to receive the grant of its bus request.

Typically, functional logic that is contained within the various bus masters remains fully operational at all times (albeit inactive at times). When maintained at an operational state, power is constantly consumed by the various logic components within the functional logic. Since a given bus master may wait for an extended period of time between requesting mastership of a bus and the grant of that mastership, excess power is often consumed by the quiescent operation of functional and other logic components within the bus master.

Accordingly, it is desired to provide a novel system and method for reducing excess power consumption in a bus master of a multi-master computer system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to an apparatus and method for reducing excess power consumption of a bus master circuit component for use in a multi-bus master system. In one embodiment, the bus master is provided in the form of an integrated circuit comprising clock control logic that is configured to disable a clock signal that is otherwise delivered to functional circuitry contained within the integrated circuit during a period of time between the request for mastership of a bus and actual assumption of bus mastership of the bus.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Figure 1:
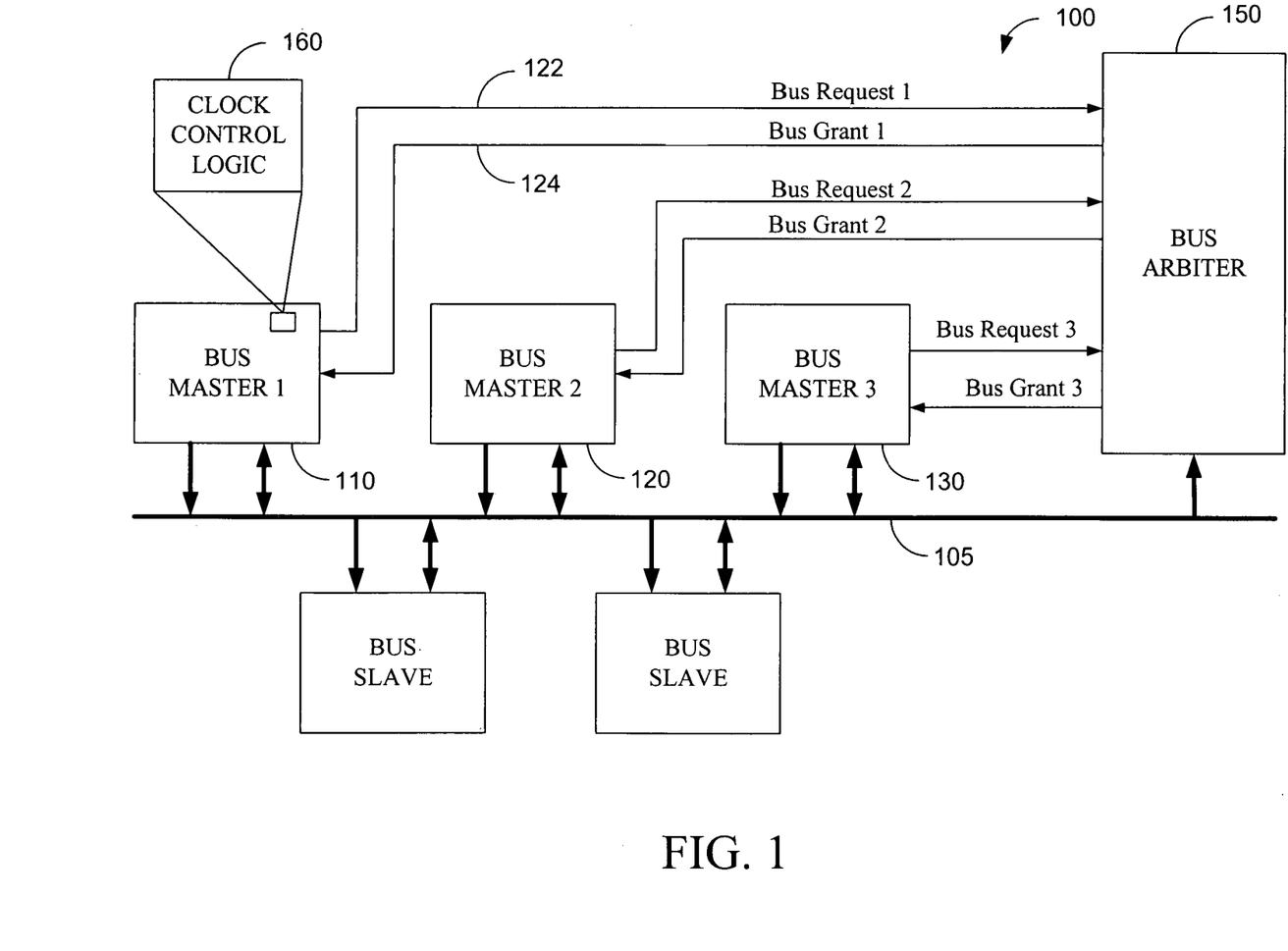
FIG. 1 is a block diagram illustrating certain components in a multi-bus master system constructed in accordance with an embodiment of the present invention.

Reference is now made to FIG. 1, which is a block diagram of a multi-bus master system 100 constructed in accordance with one embodiment of the present invention. The system illustrated in FIG. 1 depicts only certain logic components in such a system, and it should be appreciated that many details are omitted for simplicity of illustration. In the system illustrated in FIG. 1, there are three logic components capable of assuming mastership of a bus 105. These components are designated as bus masters 110, 120, and 130. As is known, a bus master is a device that can take "ownership" of a bus, in that the device drives the bus or otherwise controls signaling transactions that occur over the bus 105. In the embodiment illustrated in FIG. 1, each of the bus masters 110, 120, and 130 operate in similar fashions to assume ownership (or mastership) of the bus 105. Therefore, for simplicity of discussion, only operational aspects of bus master 110 will be described herein.

Before assuming mastership of the bus 105, bus master 110 asserts a bus request signal 122. This signal may be asserted by driving the signal to a logic one state, driving the signal to a logic zero state, or asserting a pulse over the signal line 122, depending upon the embodiment and implementation desired. Consistent with the scope and spirit of the present invention, any of the foregoing methodologies may be implemented. After asserting a signal on a bus request line 122, the bus master 110 then awaits the receipt of an assertion of its bus grant signal, carried on line 124. The bus grant signal is generated by a bus arbiter 150.

As is known, bus arbitration logic manages and coordinates the bus request and bus grant signaling, in a manner that ensures only one bus master is granted mastership of the bus 105 at a given time. Various priorities and other management schemes for the bus arbitration are well known, and need not be described herein. Indeed, the bus request, bus grant, and other signaling that is carried out for management and control of bus mastership among the bus masters and bus arbiter are well known, and need not be described herein.

Instead, a novel aspect of the present invention relates to the reduction of power consumption within one or more of the bus master components 110, 120, and 130 during a time period between the assertion of the bus request signal and the receipt of the bus grant signal. In one embodiment, the bus masters 110, 120, and 130 reduce this excess power consumption by disabling or inhibiting the signaling of a clock that is used to clock internal synchronous functional circuitry within the bus masters 110, 120, and 130. By inhibiting a clock signal in this way, excess and unnecessary component switching (e.g., the switching of transistor gates in response to the transition of a clock) is avoided. In this regard, even though no signaling inputs or output of a device are changing, the mere oscillation of a clock input causes transistors within the device to switch, thereby consuming power.

To carry out the power-reduction function, each of the bus masters 110, 120, and 130 may include clock control logic 160 (clock control logic 160 is specifically illustrated for bus master 110, but may be included in each of the remaining bus master components as well). In this regard, the clock control logic 160 of an embodiment of the invention may be utilized in a variety of bus master system platforms, having architectures different than that of FIG. 1. Furthermore, the clock control logic 160 may be implemented in a variety of fashions.

Figure 2:
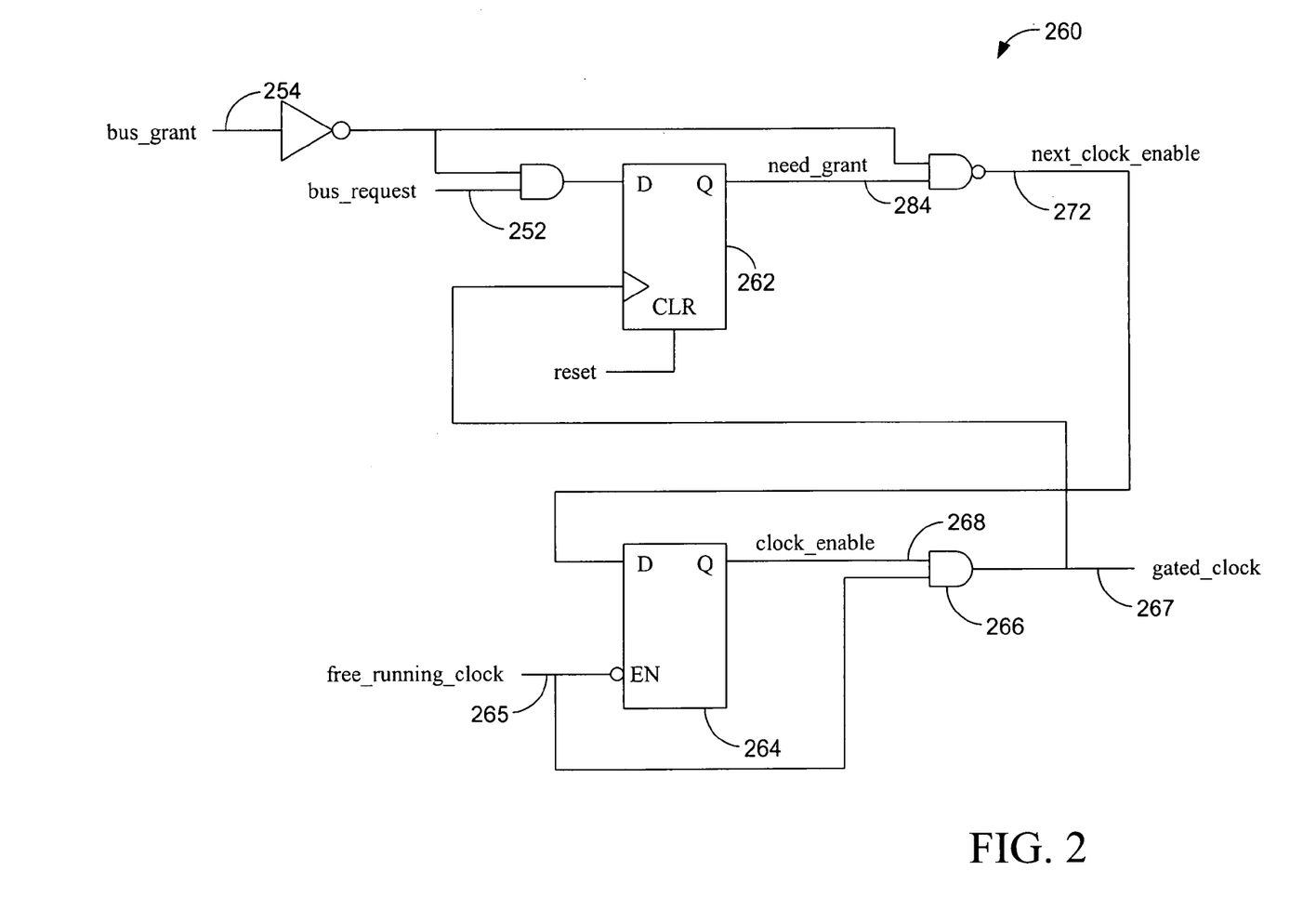
FIG. 2 is a schematic diagram illustrating one embodiment of clock control logic of a bus master component, constructed in accordance with an embodiment of the present invention.

Reference is now made to FIG. 2, which depicts a schematic diagram illustrating an implementation of the clock control logic 260 in accordance with one embodiment of the present invention. The clock control logic of FIG. 2 principally utilizes one D-type flip-flop 262 and one D-type latch 264. The clock control logic of this embodiment includes two signal inputs, the bus_request signal 252 and the bus_grant signal 254. A free_running_clock signal 265 is also input to the clock control logic 260. The clock control logic 260 generates the output gated_clock signal 267. When the free_running_clock signal 265 is inhibited or disabled, the gated_clock signal 267 will be a steady-state value. In this regard, the gated_clock signal 267 may be maintained at either a logic one or logic zero, depending on design preferences, system characteristics, or other variables, consistent with the scope and teachings of the present invention. During normal operation, the free_running_clock signal 265 is passed through (i.e. uninhibited) to the gated_clock signal 267. In this regard, the free_running_clock signal 265 is either inhibited or uninhibited based upon the value of the clock_enable signal 268, which is input to AND gate 266. The value of the clock_enable signal 268 is determined by the input value to the D-type latch 264, which is the value of the next_clock_enable signal 272. The next_clock_enable signal 272 is determined by the values of the bus_request signal 252 and bus_grant signal 254.

Figure 3:
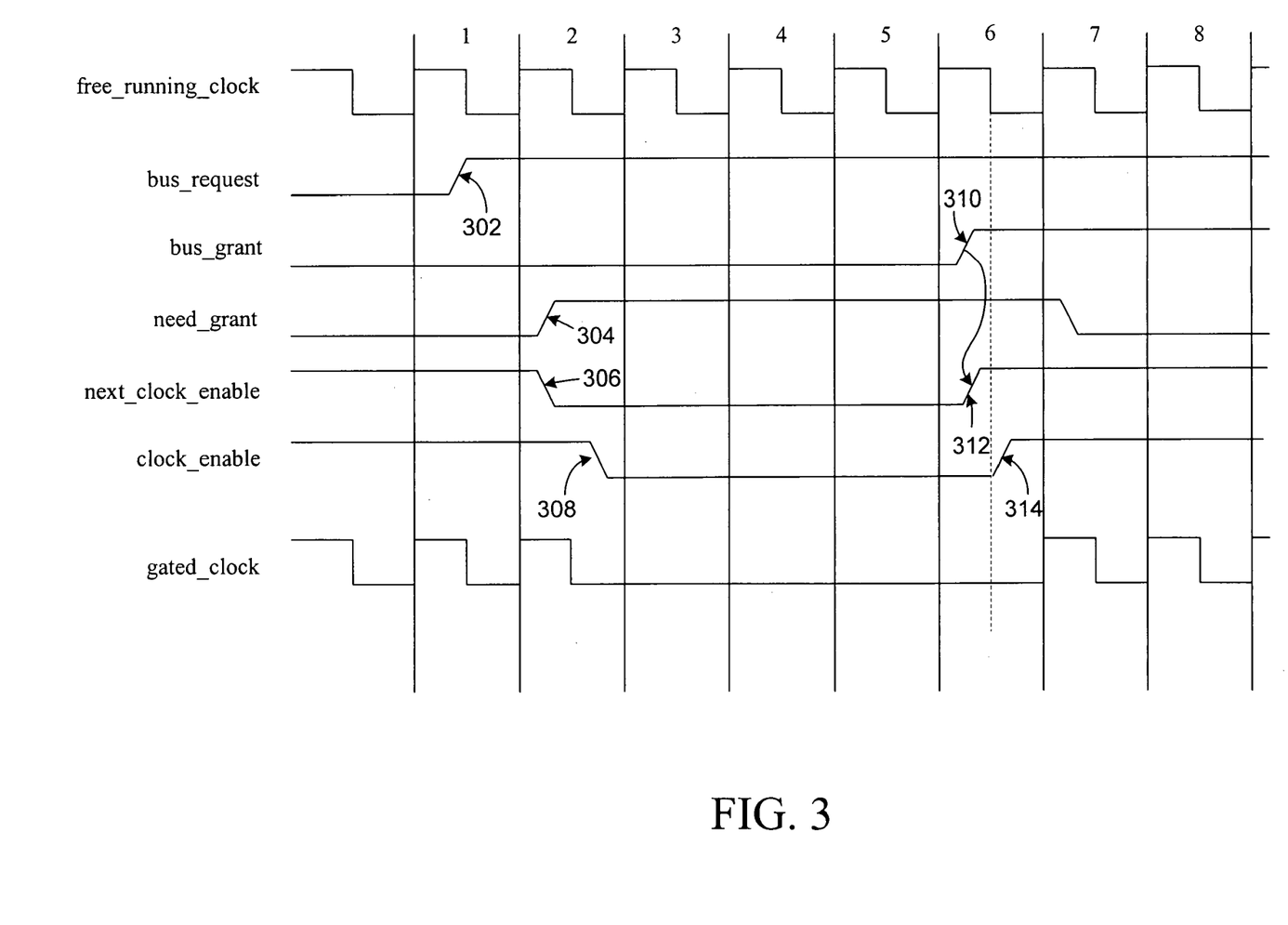
FIG. 3 is a timing diagram illustrating the timing of various signals of the circuit illustrated in FIG. 2.

To better illustrate the operation of the circuitry of FIG. 2, reference is made to FIG. 3, which is a timing diagram illustrating the timing and signal values of the various signals illustrated in FIG. 2. The free_running_clock signal 265 is illustrated on the top line of the timing diagram of FIG. 3. In this embodiment, the bus_request signal 252 and bus_grant signal 254 are asserted when in a high or logic one state. Therefore, as illustrated in FIG. 3, prior to the assertion 302 of the bus_request signal 252, the bus_request signal 252 and bus_grant signal 254 are both at a logic zero level. The need_grant signal 284 is also at a logic zero state. Consequently, the next_clock_enable signal 272 is in a logic one state, placing the clock_enable signal 268 in a logic one state as well. Therefore the free_running_clock signal 265 is passed through the AND gate 266, such that gated_clock signal 267 is a clock signal having the same timing as the free_running_clock signal 265.

After the bus_request signal 252 is asserted 302, the need_grant signal 284 transitions 304 to a logic one state, after the rising edge of the free_running_clock signal 265 (and propagation delays of the flip-flop 262). The next_clock_enable signal 272 transitions 306 from a logic one to a logic zero immediately thereafter. The clock_enable signal 268 then transitions 308 from a logic one to a logic zero during the low pulse of the free_running_clock signal 265. The logic zero value of the clock_enable signal 268 is gated through the AND gate 266 to ensure that the gated_clock signal 267 remains in a logic zero state. As illustrated in FIG. 3, the gated_clock signal 267 stays in this logic zero state (disabled or inhibited) until the bus_grant signal is asserted 310.

Upon the assertion of the bus_grant signal 254, the next_clock_enable signal 272 transitions 312 from a logic zero to a logic one state. Thereafter, during the next low pulse of the free_running_clock signal 265, the logic one value of the next_clock_enable signal 272 is enabled through latch 264 to the clock_enable signal 268. When in a high state, the clock_enable signal 268 allows the free_running_clock signal 265 to pass through the AND gate 266. Therefore, once the clock_enable signal 268 transitions 314 from a zero to a one state, the value of the free_running_clock signal 265 is passed through to the gated_clock signal 267.

As can be appreciated by persons skilled in the art from the schematic of FIG. 2, and as is further depicted in the timing diagram of FIG. 3, the clock control logic 260 operates to disable or inhibit the free_running_clock signal 265 (in the form of the gated_clock signal 267) during a time period following the request of a bus_request signal 252 and substantially coincident with the receipt of the bus_grant signal 254.

In the embodiment illustrated in FIG. 2 and described above, the gate_clock signal 267 is disabled or inhibited in response to the assertion of the bus_request signal 252. Likewise, the gated_clock signal 267 is uninhibited or re-enabled in response to the assertion of the bus_grant signal 254. Consistent with the scope and spirit of the invention, other embodiments and implementations may be provided with variations in the timing of when a "gated clock" signal is disabled and re-enabled. For example, the assertion of the bus request signal and/or bus grant signal may be anticipated or approximated based upon other events or circuit conditions, and the clock signal may be disabled in connection therewith. In this regard, the disabling of the clock signal by the clock control logic may be characterized by being substantially coincident with the assertion of the bus request signal, and the uninhibiting or re-enabling of the clock signal may be characterized as being substantially coincident with the assertion of the bus grant signal. Similarly, the clock signal may be disabled during a period beginning after the assertion of the bus request signal and ending prior to (or commensurate with) the assumption of mastership of the bus by the requesting bus master.

Figure 4:
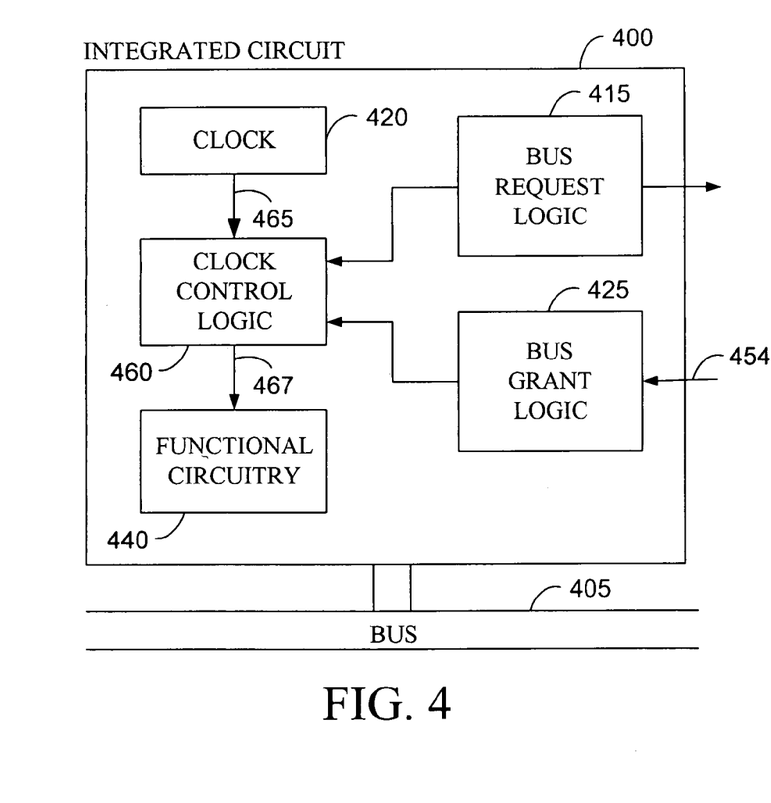
FIG. 4 is a block diagram illustrating certain logic components of an integrated circuit constructed in accordance with an embodiment of the present invention.
Figure 5:
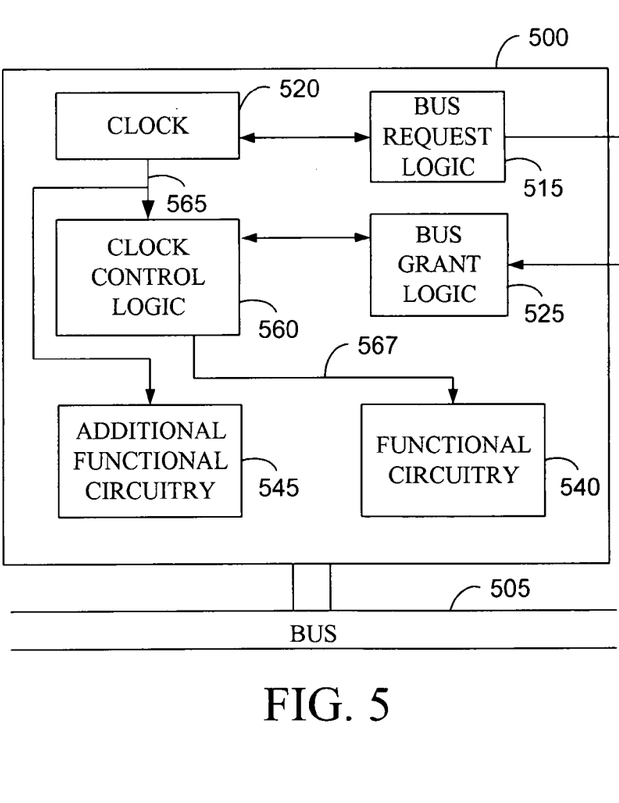
FIG. 5 is a block diagram similar to FIG. 4, illustrating certain components of an integrated circuit constructed in accordance with an alternative embodiment of the present invention.

The foregoing has described certain features of an embodiment of the present invention. Reference is now made to FIGS. 4 and 5, which illustrate certain logic components in configurations of alternative embodiments. In FIG. 4, an integrated circuit 400 is shown. The integrated circuit 400 may be configured to operate as a bus master, and therefore includes bus request logic 415 for generating a bus request signal to be sent to arbitration logic. Likewise, the integrated circuit 400 may include bus grant logic 425 for receiving and operating upon a bus grant signal generated by the arbitration circuitry. In some embodiments, the bus grant logic 425 may simply be a direct connection to the bus grant signal (i.e., the bus grant signal 454 may be passed directly through bus grant logic 425 unchanged). The bus request logic 415 and bus grant logic 425 may be implemented in conventional fashion, and therefore need not be described further herein.

In regard to a unique feature of the embodiment of FIG. 4, clock control logic 460 is provided for gating an otherwise free-running clock 420 to disable or inhibit the free-running clock signal 465 generated by the free-running clock 420. The gated (or inhibited) clock signal 467 is input to functional circuitry 440 of the integrated circuit 400. When the gated clock signal 467 is at a steady-state (non-oscillating) value, synchronous circuit components that are responsive to the clock operate in a reduced power mode.

FIG. 5 illustrates a similar embodiment, wherein like reference numerals are used to indicate like components. The principle difference between the embodiments of FIG. 4 and FIG. 5 is that FIG. 5 contemplates additional functional circuitry 545 within the integrated circuit 500 that the free-running clock 520 is provided on a continuous basis. That is, the embodiment of FIG. 5 contemplates an integrated circuit 500 having functional circuitry 540 in which the clock signal may be inhibited in order to save power during a period of time while bus mastership is being requested, as well as additional functional circuitry 545 having an input clock that is not to be inhibited.

Figure 6:
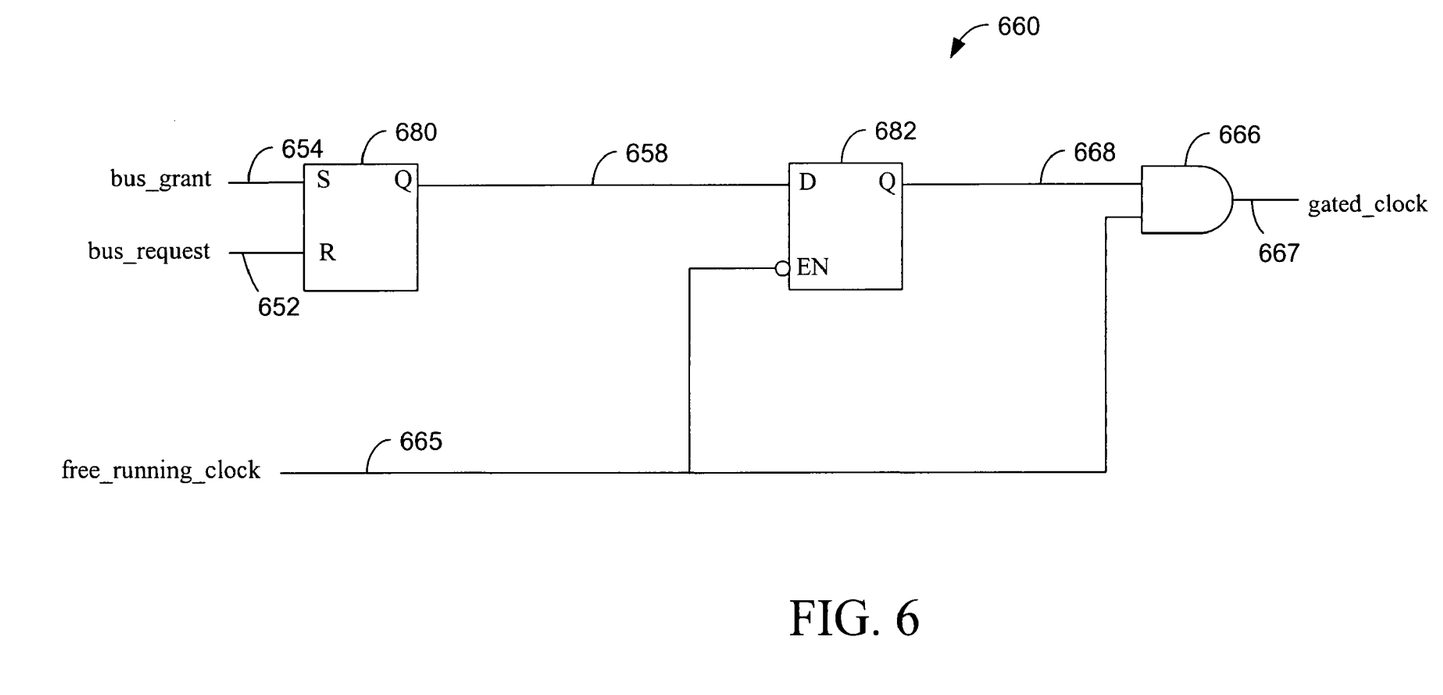
FIG. 6 is a schematic diagram illustrating one embodiment of clock control logic of a bus master component, constructed in accordance with an embodiment of the present invention.

Reference is now made to FIG. 6, which illustrates clock control logic 660 as implemented in an alternative embodiment of the present invention. As with the functional operation of the circuitry illustrated in FIG. 2, the circuitry illustrated in FIG. 6 similarly operates to gate a free-running clock, so as to disable or inhibit the free_running_clock 665 at a gated_clock output 667. Like the AND gate 266 of FIG. 2, the circuit of FIG. 6 uses an AND gate 666 for gating the free_running_clock 665 with a clock_enable signal 668. The remainder of the clock control logic 660 of this embodiment includes the utilization of two memory elements 680 and 682. A first memory element may be implemented as a type of set/reset latch 680, wherein the bus_request signal 652 is connected to the "reset" input of the set/reset latch 680 and the bus_grant signal 654 is connected to the "set" input of the set/reset latch 680. Such an embodiment also contemplates that the set/reset latch 680 be designed such that the bus_grant signal 654 takes precedence or priority over the bus_request signal 652. Thus, when both the bus_request signal 652 and the bus_grant signal 654 are at a logic one value, the "set" input to the set/reset latch 680 takes precedence such that the output 658 is a logic one.

A second memory element may be implemented as a D-type latch 682. The output 658 of the set/reset latch 680 is directed to the D-input of latch 682, which is configured to enable the input 658 to the output 668 during the low pulse of the free_running_clock 665.

In operation, when the bus_request signal 652 is asserted, latch 680 is reset, thereby placing its output 658 in a logic zero state. This logic zero state is propagated through AND gate 666, so that the gated_clock signal 667 remains in a logic zero state. This operates to inhibit or disable the free_running_clock 665 from being propagated through the gated_clock signal 667. When, however, the bus_grant signal 654 is asserted, the output 658 of latch 680 becomes a logic one, which gets propagated through the D-type latch 682 placing its output 668 in a logic one state. The logic one state of signal 668 impacts the AND gate 666, such that the free_running_clock 665 is propagated through to the gated-_clock signal 667.

It should be appreciated that the functional operation of the set/reset latch 680 (e.g., the operation ensuring precedence of one input over the other) may be ensured through logic or circuitry internal to the latch 680. Alternatively, the operation described above may be ensured through the use of logic components external to the latch 680 (not shown in the drawings).

Figure 7:
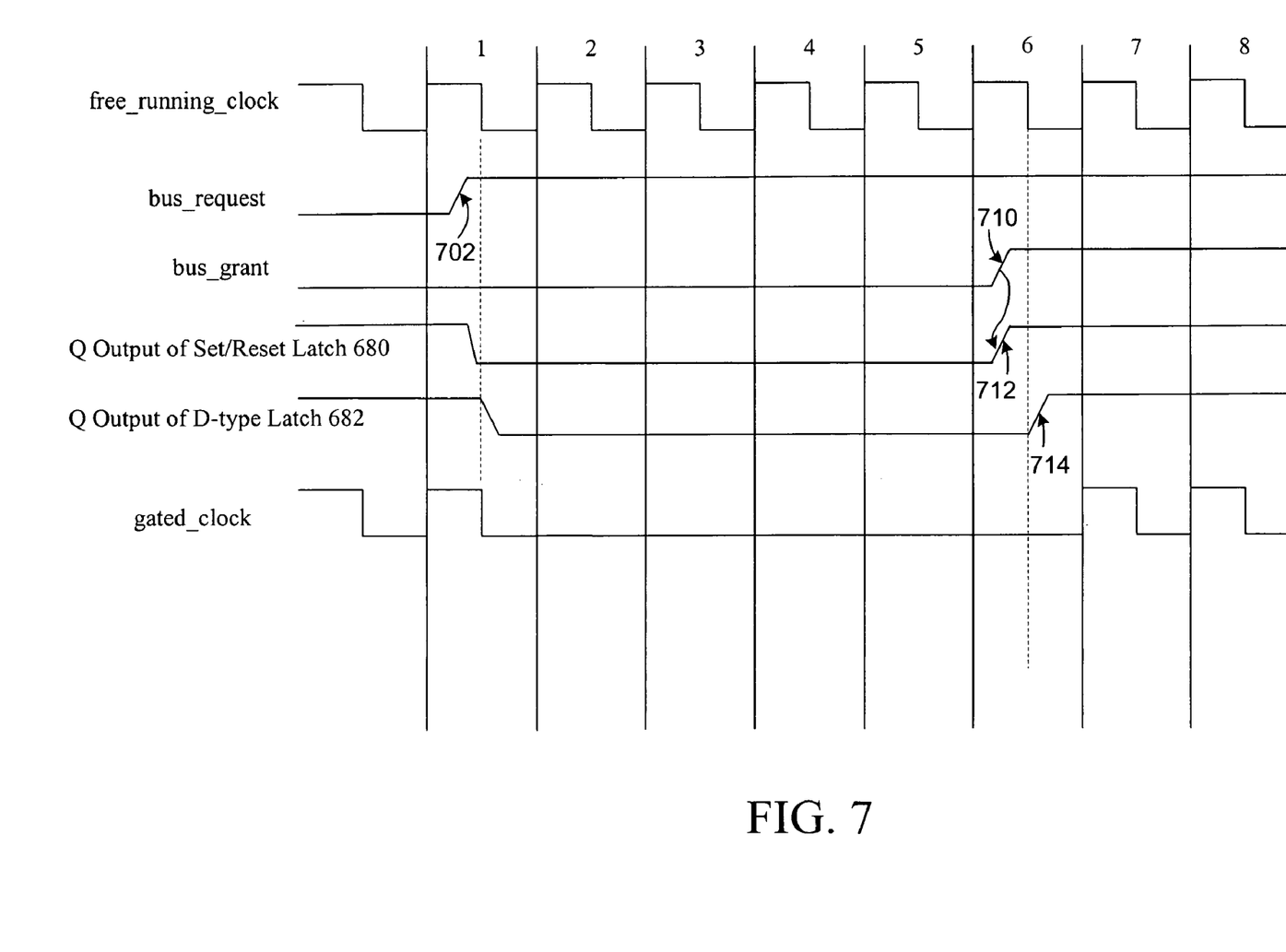
FIG. 7 is a timing diagram illustrating the ideal timing of the signals illustrated in FIG. 6.

Reference is made briefly to FIG. 7, which illustrates the timing and interrelationship of various signals of the embodiment of FIG. 6. For purposes of illustration, the timing diagram of FIG. 7 assumes an ideal (i.e., zero) delay for the AND gate 666. As can be seen, like the timing diagram of FIG. 3, the clock control logic illustrated in FIG. 6 operates to inhibit or disable the free_running_clock 665 during a time period after bus mastership has been requested and before bus mastership has been granted to the requesting circuit.

More specifically, as shown in FIG. 7, transition 702 of the bus_request signal 652 from logic zero to a logic one state causes the output of the latch 680 to transition from a logic one to a logic zero state. During the next low pulse of the free_running_clock 665, the output of the D-type latch 682 transitions from a logic one to a logic zero as well. This gates the clock signal (via AND gate 666), so that the gated_clock signal 667 remains in a logic zero state. The gated_clock signal 667 remains in this state until the bus-_grant signal 654 is asserted. In this regard, when the bus_grant signal 654 transitions 710 from a logic zero to a logic one state, the output of the set/reset latch 680 likewise transitions 712 from a logic zero to a logic one value. Thereafter, during the next low pulse of the free_running-_clock 665, the output of the D-type latch 682 transitions 714 from a logic zero to a logic one value, thereby uninhibiting or re-enabling the gated_clock signal 667.

It should be appreciated that, consistent with the scope and spirit of the invention, the clock control logic may be implemented in a variety of ways, and timing relationships of specific signals may vary from embodiment to embodiment. For example, the bus request and bus grant signals have been described herein as being asserted when they transition from a logic zero to a logic one level. Consistent with the invention, these signals could also be asserted when transitioning from a logic one to a logic zero state. Likewise, these signals may be asserted by pulsing them high or low.

The foregoing description is not intended to be exhaustive or to limit the invention to the precise forms disclosed. Obvious modifications or variations are possible in light of the above teachings. Further, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An integrated circuit comprising:
    bus request logic configured to assert a bus request signal;
    functional logic operative to control transactions over a system bus as a bus master, after receiving a bus grant signal; and
    clock control logic configured to disable at least one clock signal used to clock synchronous circuitry of the functional logic in response to the assertion of bus request signal, the clock control logic further configured to enable the at least one clock signal in response to receipt of the bus grant signal.

2. The integrated circuit of claim 1, further comprising functional logic that operates in a synchronous manner in response to the at least one clock signal.

3. An integrated circuit comprising clock control logic configured to disable at least one clock signal of the integrated circuit in response to a bus request signal, the clock control logic further configured to enable the at least one clock signal in response to receipt of a bus grant signal.

4. An integrated circuit capable of being a bus master, the improvement comprising clock control logic capable of disabling or inhibiting a clock signal of the integrated circuit after assertion by the integrated circuit of a bus request signal, the clock control logic further capable of enabling the clock signal substantially coincident with receipt of a bus grant signal.

5. The integrated circuit of claim 4, further comprising synchronous logic that operates in response to the clock signal.

6. An integrated circuit capable of being a bus master comprising clock control logic configured to disable at least one clock signal of the integrated circuit during a period of time between a first time in which the integrated circuit has requested to be a bus master and a second time in which bus mastership has been assumed by the integrated circuit.

7. The integrated circuit of claim 6, wherein the clock control logic is more specifically configured to disable the at least one clock signal during substantially the entire period of time in which the integrated circuit has requested to be a bus master and the time when bus mastership has been assumed by the integrated circuit.

8. The integrated circuit of claim 6, wherein the clock control logic comprises circuitry configured to disable the at least one clock signal in response to a bus request signal.

9. The integrated circuit of claim 6, wherein the clock control logic comprises circuitry configured to disable the at least one clock signal substantially coincident with a bus request signal.

10. The integrated circuit of claim 6, wherein the clock control logic comprises circuitry configured to enable the at least one clock signal in response to a bus grant signal.

11. The integrated circuit of claim 6, wherein the clock control logic comprises circuitry configured to enable the at least one clock signal substantially coincident with a bus grant signal.

12. A method of assuming mastership of a bus comprising:
    asserting a bus request signal;
    disabling or inhibiting an internal clock signal substantially coincident with the bus request signal;
    receiving a bus grant signal; and
    enabling the internal clock signal substantially coincident with the bus grant signal.

13. The method of claim 12, wherein disabling the internal clock signal substantially coincident with the bus request signal comprises disabling the internal clock signal in response to an assertion of the bus request signal.

14. The method of claim 12, wherein disabling the internal clock signal substantially coincident with the bus request signal comprises disabling the internal clock signal after an assertion of the bus request signal.

15. The method of claim 12, wherein enabling the internal clock signal substantially coincident with the bus grant signal comprises enabling the internal clock signal in response to an assertion of the bus grant signal.

16. The method of claim 12, wherein enabling the internal clock signal substantially coincident with the bus grant signal comprises enabling the internal clock signal after an assertion of the bus grant signal.

* * * * *